April 5, 1966 H. WOHLNICK 3,244,270

SCREW TYPE CONVEYOR

Filed Aug. 29, 1963

INVENTOR.
HANS WOHLNICK
BY Bosworth, Sessions,
Herrstrom & Knowles
ATTORNEYS

United States Patent Office 3,244,270
Patented Apr. 5, 1966

3,244,270
SCREW TYPE CONVEYOR
Hans Wohlnick, Dusseldorf-Unterrath, Germany, assignor to Blaw-Knox Company, Pittsburgh, Pa., a corporation of Delaware
Filed Aug. 29, 1963, Ser. No. 305,308
2 Claims. (Cl. 198—213)

This invention relates to conveyors for moving elongated workpieces such as pipes, tubes, rounds and the like transversely of their axes and more particularly to conveyors of the screw type. The invention is described herein as applied to cooling beds on which pipes, tubes, rounds and other elongated metal workpieces are cooled after welding, forming, rolling or other operations in which the material is at an elevated temperature, but it is to be understood that the invention may be adapted to other uses and purposes.

In apparatus to which the present invention is particularly adapted, elongated workpieces are moved transversely from a run-out conveyor, on which they travel longitudinally, onto a cooling bed which comprises a transverse conveyor on which the workpieces are moved transversely of their axes and on which they are permitted to cool. The transverse conveyor delivers the workpieces to a discharge conveyor, on which they again travel in a longitudinal or axial direction.

Chain type conveyors have been used extensively in such cooling beds. In these, the workpieces always rest with the same areas in contact with the supporting members on the chains with the result that these areas are cooled quickly. Stresses in the stock that is cooling develop as a result of non-uniform cooling. Screw type cooling beds consisting of screws disposed parallel to each other and extending generally horizontally and driven in the same rotational direction are also known. These screws are single-threaded and the workpieces that are being cooled rest on the root or hub portions of the screws between adjacent turns of the single thread ordinarily provided on the screws. Sliding friction develops between the workpieces and the screws of this type for the reason that the cooling stock contacts each conveyor screw at two places; i.e., the workpiece rests on the root or hub portions of each screw and is engaged by the screw thread. The engagement with the rotating hub tends to advance the workpiece longitudinally while the thread tends to rotate it and partially hold back in its longitudinal movement. Thus, there is a sliding engagement between the workpiece and both the root or hub portion and the threads. The sliding may damage the surface finish of the stock. Also, in prior types of screw conveyors the workpieces are separated by the width of the threads and thus the capacity of the conveyors is reduced.

The general object of the present invention is to provide an improved conveyor eliminating the disadvantages of previous conveyors. Another object is to provide a screw type conveyor having a greater capacity than known screw type conveyors. A further object is the provision of a cooling bed embodying an improved screw type conveyor.

A preferred form of the invention is illustrated somewhat diagrammatically in the drawing in which.

Preferably a conveyor made according to my invention is made up of a plurality of parallel conveyor screws positioned adjacent each other, and with the pitch, spacing and depth of the threads on the conveyor screws proportioned in such a manner with respect to the dimensions of the workpieces to be conveyed that the workpieces such as tubes, pipes, rods, rounds or the like are supported on the surfaces of adjacent threads without touching the hub or root portions of the screws. Preferably the conveyor screws are provided with multiple threads; for example, with four threads.

Figure 1:
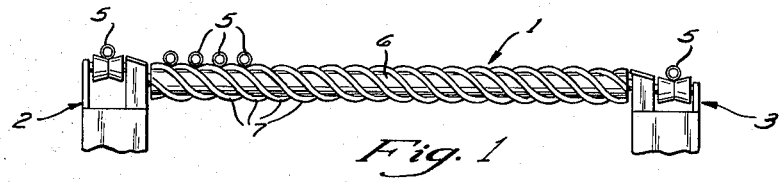
FIGURE 1 is an elevational view showing a conveyor screw made according to the invention, the screw being embodied in a cooling bed.
Figure 2:
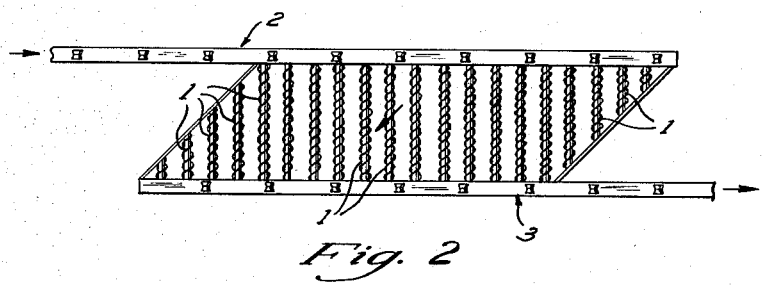
FIGURE 2 is a plan view, on a reduced scale, of the cooling bed shown in FIGURE 1.

Referring to the drawings, FIGURES 1 and 2 illustrate a cooling bed embodying a transverse conveyor made up of a plurality of generally horizontally disposed conveyor screws indicated in general at 1. The screws 1 are of the same hand and are driven at the same speed and in the same direction by any conventional means (not shown). The screws 1 receive elongated workpieces such as the tubes 5 (only a few of which are shown) from a runout conveyor 2, which may be of any conventional construction, and convey the workpieces to a discharge conveyor 3, which also may be of conventional construction. The tubes or other elongated workpieces are carried to the cooling bed, in the direction shown by the arrow, by the runout conveyor 2 and are transferred to the cooling bed by a conventional kick-out mechanism or other means (not shown). The tubes then travel diagonally across the cooling bed as indicated by the arrow and then are carried longitudinally by the discharge conveyor 3 in the direction indicated by the arrow. The screws at the ends of the bed may be shortened as shown to conform to the diagonal path of the workpieces 1. Obviously the workpieces can be delivered to and discharged from the cooling bed in any convenient or known manner.

Figure 3:
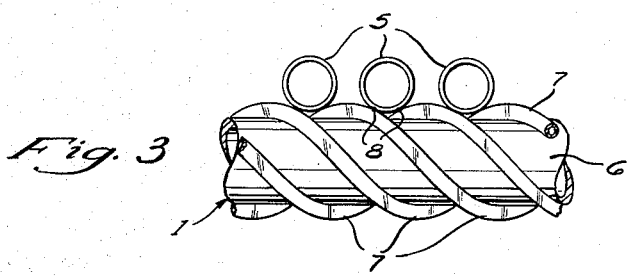
FIGURE 3 is a fragmentary elevational view, on an enlarged scale, illustrating one of the conveyor screws of the cooling bed with a plurality of tubes resting upon it.
Figure 4:
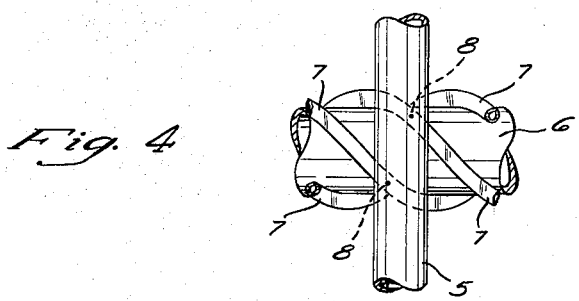
FIGURE 4 is a fragmentary plan view of one of the conveyor screws with a tube resting upon it, to the same scale as FIGURE 3.

As shown in FIGURES 1, 3 and 4, each screw 1 comprises a main cylindrical body 6 forming the root or hub portion of the screw and one or more threads 7. The body 6 may consist of a tube as shown, and the thread or threads 7 may also consist of a smaller tube or tubes wound helically around the body 6 and welded or otherwise secured thereto. Screws can be manufactured in this manner more economically than by machining them from bar stock. Preferably, the screws embody more than one thread, four threads 7 being shown in the drawing.

As shown in FIGURES 3 and 4, the pitch and spacing of the threads 7 are such that the tubes 5 are held out in engagement with the body or root portion of each groove. Instead, they are supported at contact points 8 on adjacent threads. Since the contact points are moving at the same velocity and in directions that tend to rotate the tubes 5 in the same direction about their axes, little or no sliding takes place between the tubes 5 and the conveyor screws. The result is that the conveyor screws 1 roll or rotate the tubes 5 about their own axes and cause them at the same time to travel longitudinally and transversely. The resultant motion of the tubes on the cooling bed is indicated by the arrow in FIGURE 2 and the direction of rotation of the tubes resting on the cooling bed is indicated by the arrows on FIGURE 3.

Thus, the movement of the cooling workpieces takes place without substantial sliding between the surfaces of the workpieces and the screws' longitudinal axes; therefore, the surface of the workpieces is not damaged. The workpieces are uniformly transported across the cooling bed and since they are supported by substantially point contact on the screws and since the points of contact are constantly changing the workpieces are cooled uniformly.

Therefore, they are not subject to additional stresses and distortion due to uneven cooling. Furthermore, since the workpieces being conveyed rest on the threads, rather than between the threads and in contact with the hubs of the screws as in the case of prior conveyors, it is possible to space the workpieces more closely together on the screws and thus a cooling bed of a given width can carry a greater number of workpieces than a conventional screw type cooling bed of the same width. It will also be evident, from an inspection of FIGURES 3 and 4, that workpieces substantially smaller as well as substantially larger than the illustrated tubes 5 can be accommodated on the conveyor. Thus, a given conveyor can accept and convey workpieces of quite a wide range of diameters.

While my conveyor has been described herein as applied to cooling beds, where it is especially advantageous, it is to be understood that the invention is useful for other purposes where it is desired to convey elongated workpieces transversely of their axes.

Those skilled in the art will appreciate that various changes and modifications can be made in the invention without departing from the spirit and scope thereof. The essential characteristics of the invention are summarized in the claims.

I claim:
1. A screw type cooling bed for supporting elongated workpieces and advancing them transversely thereof with substantially no sliding action on the workpieces, comprising a plurality of substantially identical parallel conveyor screws that are driven in the same direction and are of the same hand, the conveyor screws each having a root portion and a plurality of threads of such pitch that each workpiece to be cooled is supported solely on the surfaces of two adjacent threads of each conveyor screw for rotation about the axis of the workpiece and for movement of the workpiece longitudinally and transversely thereof without substantial sliding action.

2. A screw type cooling bed according to claim 1 wherein the conveyor screws each have four threads.

References Cited by the Examiner
UNITED STATES PATENTS

| | | | |
|---|---|---|---|
| 302,501 | 7/1884 | Kruse | 198—213 X |
| 371,609 | 10/1887 | Marr | 198—213 |
| 1,106,478 | 8/1914 | Slick | 198—213 X |
| 1,565,849 | 12/1925 | Durand | 198—213 |
| 2,959,268 | 11/1960 | McConnell | 198—127 |

HUGO O. SCHULZ, Primary Examiner.

WILLIAM B. LA BORDE, SAMUEL F. COLEMAN, Examiners.